Jan. 2, 1923.

E. B. WAGNER.
DIRECTION INDICATOR.
FILED AUG. 6, 1919.

INVENTOR
Ezra B. Wagner.
Strong & Townsend.
BY
ATTORNEYS

Jan. 2, 1923.
E. B. WAGNER.
DIRECTION INDICATOR.
FILED AUG. 6, 1919.
1,440,804
2 SHEETS-SHEET 2
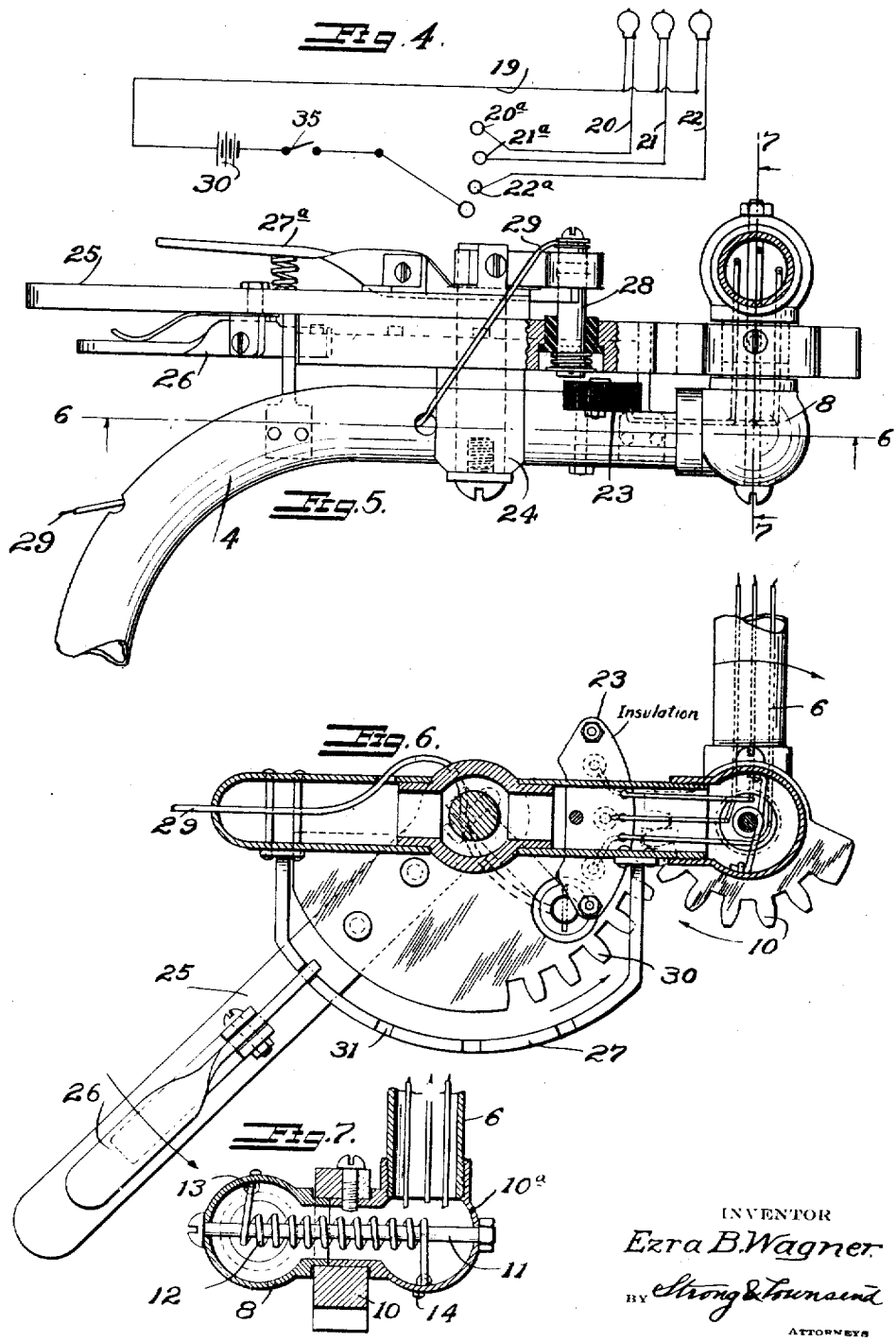

Patented Jan. 2, 1923.

1,440,804

UNITED STATES PATENT OFFICE.

EZRA BURR WAGNER, OF SAN JOSE, CALIFORNIA.

DIRECTION INDICATOR.

Application filed August 6, 1919. Serial No. 315,647.

*To all whom it may concern:*

Be it known that I, EZRA B. WAGNER, a citizen of the United States, residing at San Jose, in the county of Santa Clara and State of California, have invented new and useful Improvements in Direction Indicators, of which the following is a specification.

This invention relates to a direction indicator for automobiles and other vehicles and particularly to a direction indicator which is equally serviceable, whether it be day or night.

The present invention is intended for the purpose of displaying a signal which visibly indicates the movement of a vehicle such as an automobile or the like, said signal being displayed on the side of the vehicle where it is visible both from the front and rear and being of a character which is adaptable both for day and night service.

One of the objects of the present invention is to provide a reliable manually operated mechanical device which may be used to display the desired signal and which will hold the signal continuously before the attention of nearby drivers so there can be no excuse for their not seeing nor reading the warning.

Another object of the invention is to provide a direction indicator which is simple and substantial in construction, cheap to manufacture, easy to install and operate, and which is equally visible, both from the front and rear.

Another object of the invention is to provide a direction indicator which employs an arm and in conjunction therewith manually actuated means for swinging the arm to assume different predetermined positions and for locking the arm when any predetermined desired position is reached. Further, to mount a series of colored signals lights on the arm, through any one of which an electric circuit may be closed to produce a visible signal or indicator when driving at night. Further objects will hereinafter appear.

The invention consists of the parts and the construction, combination and arrangement of parts as hereinafter more fully described and claimed, having reference to the accompanying drawings, in which—

Fig. 4 is a diagrammatic view of the signal lighting circuit.

Fig. 5 is an enlarged plan view, partially in section, of the mechanism whereby the direction indicator is operated.

Fig. 6 is a side elevation partially in section, taken on line 6—6 of Fig. 5.

Fig. 7 is a vertical cross section on line 7—7, Fig. 5.

Figure 1:
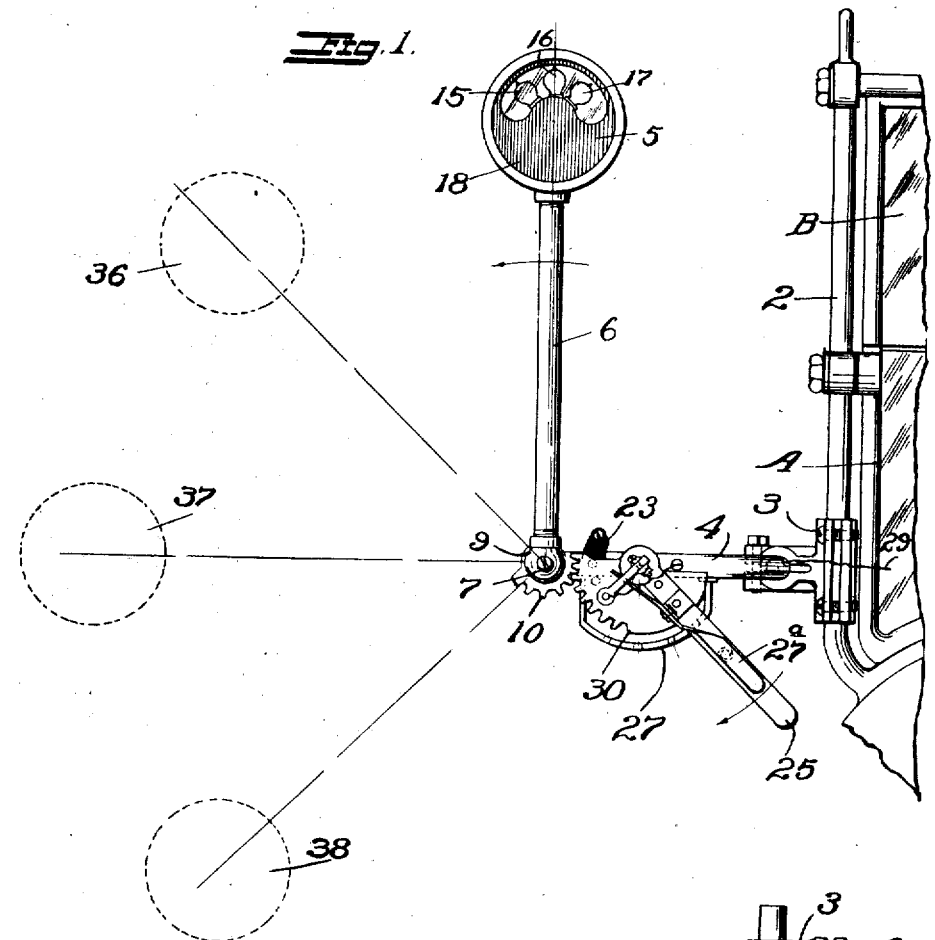
Fig. 1 is a partial view of a wind shield showing the application of the invention.
Figure 2:
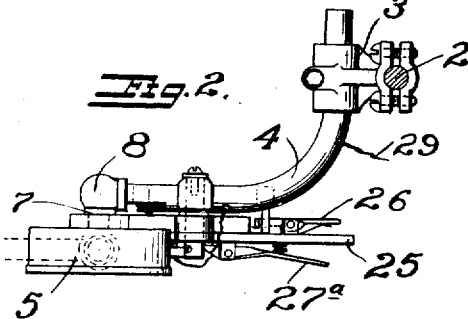
Fig. 2 is a plan view of the same.
Figure 3:
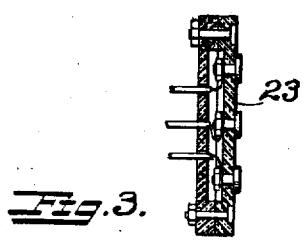
Fig. 3 is a detail sectional view of the signal light switch.

Referring to the drawings in detail, and particularly Fig. 1, A and B indicate the sections of a standard form of wind shield such as employed by automobiles and other vehicles; and 2, the frame in which the shield sections are supported. Suitably secured, as by a clamp 3, to the frame 2, is a tubular bracket rod 4, upon which is supported a direction indicator 5 and a manually operated mechanism for actuating the same. The direction indicator proper consists of a head member 5 supported by means of an arm 6 which is turnably mounted as at 7 in a socket bearing 8 secured on the outer end of the bracket tube 4. The arm 6 is secured in a socket member 9, on the inner end of which is secured a pinion gear 10. The pinion gear encloses the socket member 8 and is turnably mounted thereon, the sockets 8 and 9 being held in assembly and in alignment with each other by means of a shaft 11 which is surrounded by a spring 12. One end of the spring is secured to a projection 13 of the socket 8 while the opposite end of the spring is secured to a projection 14 of the turnable socket 9. The function of the spring 12 will hereinafter be described. The head member 5 secured on the outer end of the arm 6 has mounted interior thereof a series of colored lights such as shown at 15, 16 and 17, these lights being visible at all times, both from the front and rear as both sides of the head are closed by glass covered window openings 18. The lights are employed for night driving only and the manner of establishing circuits through the respective lights is generally indicated in Fig. 4. From this view it will be seen that a wire 19 is connected with one terminal of each lamp and that separate wires 20, 21 and 22 are connected with the opposite terminals of the lamps, the wires 20, 21 and 22 being all connected with terminal members 20ª, 21ª and 22ª secured in an insulating block 23, which is supported by the tubular bracket arm 4. Pivotally mounted on a bracket 24 secured to the tube is an operating lever 25. Mounted on one side of this lever is a spring actuated pawl 26 which is adapted to engage a notched segment 27, and pivotally mounted on the opposite side of the operating lever is a lever 27ª, on the outer end of which is carried a contact member 28. This contact member is mounted in alignment with the terminals 20ª, 21ª and 22ª and as the contact member swings on the arc of a circle when the main operating lever 25 is operated, it can readily be seen that the terminals 20ª, 21ª and 22ª are also arranged in an arcular path on the insulating block 23.

The contact member 28 may be raised into or out of engagement with any of the terminals specified and as the contact 28 is connected through a wire 29 with one terminal of a battery 30 and wire 19 with the opposite terminal, it can readily be seen that a circuit may be established through any one of the signal lights 15, 16 or 17, as may be desired. The main operating lever 25 serves other purposes besides that of moving the contact member into or out of alignment with the terminal members 20ª, 21ª and 22ª. By referring to Figs. 1 and 6, it will be seen that a gear 30 is secured to the terminal end of the operating lever 25 and that this gear intermeshes with the pinion 10. Movement of the operating lever will therefore be transmitted through the gears 10 and 30 to swing the arm 6 to assume any one of the dotted line positions shown in Fig. 1 as the pinion 10 is turnably mounted on the stationary socket member 13.

In displaying a signal it is desirable to permit the arm 6 to remain for a certain time period in the position to which it has been swung. I have therefore provided the spring actuated latch 26 and the segmental rack bar 27. The notches shown at 31, which are formed in the rack bar, are so positioned that the arm 6 may be locked when the arm assumes the vertical position shown in Fig. 1 or any of the dotted line positions shown in the same figure and it may similarly be released and returned to normal position by merely depressing the spring actuated latch 26 and returning the arm by means of the lever 25.

By referring to Figs. 5, 6 and 7, it will be seen that all the wires employed in connection with the signal lights 15, 16 and 17 are carried within the hollow arm 6 and the tubular bracket arm 4. Similarly, that a dust and water-proof connection is formed between the swinging arm and the tubular bracket arm by means of the stationary socket member 8 and the pinion gear 10.

Short-circuiting of the connections is thereby, to a large extent, avoided, and reliable operation can be depended upon.

In actual practice it should be obvious that the direction indicator as a whole may be mounted on one side of the wind-shield or the other which it may be conveniently reached by the driver or the operator of the vehicle. Similarly, that a casing may be provided for enclosing the operating mechanism comprising the contact members and gears 10 and 30. Such housing is employed in actual practice but has been eliminated in the present instance to permit better disclosure of the mechanism employed. The gears are of the mutilated type by preference as the range of movement is so small that complete gears are not required. In actual operation, when operating in the daytime, it is obvious that a switch such as indicated at 35, may be employed to break the circuit through the lights 15, 16 and 17. thus rendering operation of the contact 28 and the lever by which it is operated, ineffective. The traffic laws in the State of California demand that the driver of a vehicle shall extend and hold his arm at an upward angle of 45° when he desires to turn to the right; in a horizontal position, when turning to the left and on a downward angle of 45° if he desires to slow down or stop.

I have therefore provided four notches on the segment 27, one to secure the arm 6 in the vertical, inoperative position shown and the other notches to secure the arm in the dotted line positions shown. Therefore, if it is desired to turn to the right, it is only necessary to move the main operating lever 25 to the first notch in the segment as this will cause the arm 6 and the head member to assume the dotted line position shown at 36. If it is desired to turn to the left, the operating lever is moved to the second notch, causing the direction indicator to assume the position shown at 37. If it is desired to slow down or stop, the operating lever is moved to the last notch, causing the direction indicator to assume the position shown at 38. The spring 12 previously referred to in the specification serves a useful function during the movement of the arm 6 as it is gradually placed under tension as the arm is swung in a downward direction. In other words, it serves the function of a counterweight and will therefore, to a large extent, relieve the operator of any effort when moving the lever 25 as the weight of the head 5 and arm 6 is partially counter-balanced by placing the spring under tension and similarly helps to raise the head 5 and arm 6 when movement takes place in the opposite direction.

When driving at night, it is only necessary to close the switch 35. If it is desired to slow down or stop, it is obvious that it is necessary to swing the arm 6 to the position indicated at 38. The contact 28 would, during this movement, engage the several terminal members 20ª, 21ª and 22ª and will successively close circuits through the respective lights 15, 16 and 17. This would obviously cause confusion and it is for this reason that I have provided the lever 27ª. This lever is depressed when the main operating lever is grasped. The contact 28 is therefore pulled away from the terminal members and will not engage the same when passing over the terminals; in fact, it will not engage any terminal member until the operating lever 25 and lever 27ª are released. Any confusion is therefore avoided as no light will be displayed until the desired position is obtained and the levers released.

In actual practice it is obvious that it is necessary to grasp all three levers as it is impossible to move the main operating lever before the spring actuated latch is released.

From the foregoing description it should be obvious that a practical, reliable and manually actuated direction indicator has been provided which is equally visible, whether viewed from the front or rear of the car. Similarly, that it is equally serviceable, whether employed during day or night driving and that reliance can be placed upon the device as the mechanism employed consists of very few parts and is simple and substantial and not liable to get out of order.

While a more or less specific construction is here employed, I wish it understood that changes in design and proportion may be resorted to within the scope of the appended claims; similarly, that the materials and finish of the several parts employed may be such as the experience and judgment of the manufacturer may dictate and varying conditions may demand.

Having thus described my invention, what I claim and desire to secure by Letters Patent is—

1. In a device of the character described the combination with the indicating arm and the signal lights carried thereby of an operating lever, means for transmitting movement from the operating lever to turn the arm to assume any one of a predetermined number of positions, a plurality of terminal members, wires connecting said terminal members with the lights, a contact member carried by the lever adapted to engage the terminal members, and means on the operating lever for moving the contact member into or out of engagement with any one of the terminal members.

2. A direction indicator comprising a support, an arm turnably mounted on the support, manually operated means for turning the arm to assume any one of a predetermined number of positions, means for securing the arm against movement when in any one of the predetermined positions, a plurality of colored signal lights carried by the arm, a switch member, a plurality of terminal members thereon, one connected with each light, a single contact member carried by the means for turning the arm adapted to establish a circuit through any one of the terminal members, and means for holding the single contact member out of engagement with the terminal members when moving over the same.

3. A direction indicator comprising a support, an arm turnably mounted on the support, a head member on the outer end of the arm, a plurality of signal lights in the head member, a pinion gear secured on the inner end of the arm, a second gear with which the pinion gear intermeshes, a pivotal mounting for said second named gear on the support, an operating lever secured to the last named gear, an insulating block mounted on the support, a plurality of terminal members secured in said block, wires connecting said terminal members with the lights, a constant member carried by the lever adapted to engage the terminal members, means on the operating lever for moving the contact member into or out of engagement with the contacts, a spring actuated latch on the operating lever, a segmental-shaped rock bar with which said latch is adapted to engage, and notches formed in said rack bar for the reception of the latch, said notches and latch adapted to lock the operating lever and the arm in predetermined positions.

4. A direction indicator for automobiles and other vehicles comprising a tubular bracket member, a stationary socket secured on the outer end of said tube, a gear turnably mounted on said socket member, an arm secured to said gear, a shaft extending through the arm, gear and stationary socket member, a spring surrounding the shaft, secured at one end to the arm and at the opposite end to the stationary socket member, a head member on the outer end of the arm, a gear turnably mounted on the tubular bracket member, intermeshing with the pinion, an operating lever secured to the gear, a spring actuated latch on the operating lever, and a notched rack bar with which the latch is adapted to engage.

5. A direction indicator for automobiles and other vehicles comprising a tubular bracket member, a stationary socket secured on the outer end of said tube, a gear turnably mounted on said socket member, an arm secured to said gear, a shaft extending through the arm, gear and stationary socket member, a spring surrounding the shaft, secured at one end to the arm and at the opposite end to the stationary socket member, a head member on the outer end of the arm, a gear turnably mounted on the tubular bracket member, intermeshing with the pinion, an operating lever secured to the gear, a spring actuated latch on the operating lever, a notched rack bar with which the latch is adapted to engage, a plurality of colored lights mounted in the head member, a terminal block secured on the tubular bracket, terminals secured in said block and insulated therefrom, wires connecting said terminal members with the respective lights, said wires extending through the tubular bracket member and stationary socket, the gear and the arm, a contact member carried by the operating lever and engageable with the terminal members, and a lever pivotally mounted on the operating lever, adapted to move the contact into or out of engagement with the terminal members.

6. A direction indicator comprising a support, an arm turnably mounted on the support, a pinion gear secured on the inner end of the arm, a second gear meshing with the pinion and turnably mounted on the support, an operating lever attached to the last named gear to turn the gears and the arm secured to the pinion gear, a plurality of colored signal lights carried by the arm, a plurality of stationary terminal members connected by wires with the lights, a single contact member carried by the last named gear and adapted to engage the terminal members to form a circuit therethrough, and means for holding the single contact member out of engagement with the terminal members until the desired terminal member is reached.

In testimony whereof I have hereunto set my hand in the presence of two subscribing witnesses.

EZRA BURR WAGNER.

Witnesses:
D. LAYTON,
ESTELLA BLACKLOCK.